Patented Nov. 28, 1944

2,363,777

UNITED STATES PATENT OFFICE 2,363,777

STABILIZATION OF ORGANIC SUBSTANCES

Frederick B. Downing and Charles J. Pedersen, Penns Grove, N. J., assignors to E. I. du Pont de Nemours & Company, Wilmington, Del., a corporation of Delaware No Drawing. Application December 1, 1942, Serial No. 467,554

22 Claims. (Cl. 44—71)

This invention relates to the stabilization of organic substances and particularly to the stabilization of such substances which are subject to deterioration caused by the action of molecular oxygen and catalyzed by metals and their compounds.

Many organic products, such as fats, drying oils, rubber, petroleum products, photographic developers and synthetic unsaturated compounds, are readily attacked by oxygen and the resulting deterioration imparts undesirable qualities to them and eventually destroys their usefulness.

Signal success has been achieved in recent years, in the preservation of many organic substances, by the discovery and use of compounds generically called "oxidation inhibitors" or "antioxidants." These agents, mostly oxidizable organic compounds, retard the autocatalytic process. Since antioxidants are themselves oxidized in the course of time, as a result of auto-oxidation, the beneficial effect, obtained by their use, is not permanent and they protect the organic substances only so long as they are not rendered inactive. They are, moreover, very specific in action, each group of auto-oxidizable substances requiring a different type of antioxidant for the best results.

Vanadium, chromium, manganese, iron, cobalt, copper and their catalytically active compounds accelerate the rate of oxidation of many organic substances. For example, it is well known that copper compounds speed the formation of gum in cracked gasoline and the aging of rubber; that cobalt compounds promote the oxidation of drying oils; and that iron compounds catalyze the deterioration of lubricating oils. They also accelerate the oxidation of aromatic hydroxy and amino antioxidants, used to stabilize these oxidizable substances. Hence, these metal catalysts and the antioxidants are antagonistic in action, and the normal inhibiting effect of the latter is greatly reduced in the presence of the former.

Metal compounds occur naturally in many organic products, but often in such slight traces as to cause very little harm. Their concentrations, however, are frequently raised during the course of handling and utilizing the products; vessels and conduits made of metals containing copper or iron are used for storage and transportation, or ingredients contaminated with metal compounds might be added.

The harm done by these extraneous catalysts may be prevented by at least three methods: (1) their removal by purification, but often this is practically impossible of accomplishment and usually too costly to be economically feasible, (2) the addition of a sufficient amount of an antioxidant so that its preserving effect is equal to or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization, and (3) the suppression of the catalytic activity of the metal compounds by chemical means without physically removing them from the system.

It is an object of the present invention to retard the deterioration of organic substances caused by the action of molecular oxygen and promoted by the presence of certain metal catalysts and their catalytically active compounds. Another object is to render antioxidants, which are relatively ineffective in the presence of metal catalysts and their catalytically active compounds, effective to inhibit the oxidation of oxidizable organic substances even in the presence of metal catalysts and their catalytically active compounds. A further object is to provide a new class of metal deactivators which are effective to render metal catalysts inactive to catalyze the oxidation of oxidizable organic substances containing or in contact with such metal catalysts. A more particular object is to inhibit the deterioration of petroleum hydrocarbons in the presence of metal catalysts and their catalytically active compounds. Other objects are to provide new compositions of matter and to advance the art. Still other objects will appear hereinafter.

The above and other objects may be accomplished in accordance with our invention which comprises adding to organic substances, normally subject to deterioration caused by the action of molecular oxygen and containing a catalyst of the group of manganese, iron, cobalt, copper and their compounds, normally effective to catalyze oxidation of said organic substances, a metal deactivator in a small proportion sufficient to deactivate such catalyst, such metal deactivator being identical with the compound obtained by condensing one mole of an alkali metal salt of an alpha primary amino aliphatic carboxylic acid with at least one mole of an ortho-hydroxy substituted aldehyde, aromatic in nature, so that not more than one mole of aldehyde reacts with each primary amino group of the salt. The organic substance also may and generally will contain an antioxidant which is normally effective to retard oxidation of the organic substance in the absence of the metal catalyst. We have found that such metal deactivators are capable of effectively suppressing the catalytic activity of manganese, iron, cobalt, copper and their catalytically active compounds and hence will render such catalyst ineffective to catalyze the oxidation of the organic substance including any antioxidant which may be present.

The organic substances, which may be treated in accordance with our invention, include animal and vegetable fats and oils, edible oils, fruit and vegetable juices, textile fibres, photographic developers, antioxidants, synthetic unsaturated compounds, petroleum hydrocarbons, rubber and the like. Our metal deactivators are particularly desirable in liquid petroleum hydrocarbons and especially in gum-forming hydrocarbon distillates, such as, for example, cracked gasoline. Generally, in practice, the organic substance, particularly the petroleum hydrocarbons, will also contain an antioxidant which is normally effective to materially retard the deterioration or oxidation of the organic substance in the absence of the catalytically active metals, but which is less effective in the presence of such metals.

The metal deactivators of our invention may be prepared by adding alcoholic solutions of the aldehyde to an alkaline aqueous solution of the alkali metal salt of the amino carboxylic acid and them refluxing until the reaction is complete. We believe that quite probably the aldehyde reacts with the amino group of the amino acid to form a Schiff's base type of compound represented by the formula

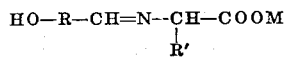

wherein R represents a divalent organic radical, aromatic in nature, whose two valences are on adjacent ring carbon atoms, R' represents a hydrogen, aliphatic, cycloaliphatic, aromatic, or heterocyclic group and M is an alkali metal. However, we have no proof of the correctness of this structure and hence we do not wish to be limited to any theory as to the structural formula of the compounds.

By an "ortho-hydroxy substituted aldehyde," we mean one in which the hydroxy group and the aldehyde, or —CHO, group are directly bonded to adjacent ring carbon atoms. By the term "aldehyde, aromatic in nature," we intend to include the unsaturated cyclic aldehydes, such as the pyridine and quinoline aldehydes which have many of the characteristic properties of the aromatic aldehydes, as well as the strictly aromatic aldehydes in which the hydroxy and aldehyde groups are bonded to ring carbon atoms of a benzene ring.

The aldehyde is preferably an aromatic aldehyde and may contain as substituents hydroxy, alkyl, aryl, alkoxy, aryloxy, halogen, heterocyclic, amino, cyano, carboxyl, sulfonic and like groups. However, we particularly prefer the ortho-hydroxy substituted aryl aldehydes which are aromatic aldehydes which, except for the hydroxy and aldehyde groups, consist of carbon and hydrogen. Also, we particularly prefer the ortho-hydroxy aromatic and ortho-hydroxy aryl aldehydes of the benzene series, by which we mean those which contain one benzene ring and no other cyclic rings.

The aldehydes may be condensed with the alkali metal salt of any alpha primary amino aliphatic carboxylic acid, that is, a salt of any aliphatic carboxylic acid containing a single primary amino group as a substituent on the alpha carbon atom. The aliphatic acid may also contain as substituents hydroxy, carboxy, amino, sulfhydryl, ether, thioether, disulfide, aromatic, heterocyclic and like groups. Preferably, the acid should contain the elements carbon, hydrogen, nitrogen and oxygen and no other elements other than suffur. Preferably, the salt, the aldehyde and the product thereof should be free of strongly acidic groups, that is, acidic groups stronger than carboxyl and sulfhydryl groups.

We particularly prefer those compounds in which the aldehyde is salicylaldehyde, such as those formed by the reaction of salicylaldehyde on sodium glycinate, disodium glutamate, sodium tyrosinate and sodium cysteinate. The names which we have assigned to these compounds and their probable formulae are Salicylal sodium glycinate

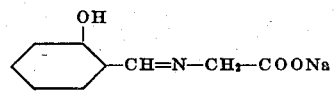

Salicylal disodium glutamate

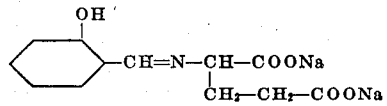

Salicylal sodium tyrosinate

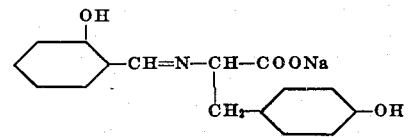

Salicylal sodium cysteinate

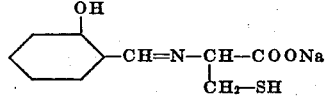

Definite operative concentrations of the metal deactivator in the organic substance cannot be specified for each case as the quantity required is dependent upon the amount of metal catalyst present in the organic substance. The metal deactivator should be present in the proportion of approximately 5 to 10 times the amount of the metal catalyst present, on the basis of the metallic element, in order to obtain complete deactivation of the metal catalyst. Higher proportions of metal deactivator may be employed, particularly when a reservoir of metal is present in the form of metal in bulk in contact with the organic substance. Generally, from about 0.001% to 0.1%, based on the weight of the organic substance, will be sufficient for most purposes, particularly when the organic substance is a liquid petroleum hydrocarbon, such as a gum-forming hydrocarbon distillate of the character of cracked gasoline.

The catalytically active metal and is compounds may be dissolved in the organic substance or suspended therein or may be in the form of metal in bulk in intimate contact with the organic substance. It will be understood that, when we refer to an organic substance containing a catalyst, we means to include those cases wherein the metal in bulk form is in contact with the organic substance, as well as those cases wherein the catalytically active metal is dissolved or suspended in the organic substance.

The deactivators may be added to the oxidizable organic substances to be protected in any form and manner. They may be in solid or liquid form, mixed with other additional agents or dissolved in a solvent. They may be dissolved in the organic substance or dispersed therein in any suitable manner. They may be added to the finished organic substance or to the organic substance at any stage in its manufacture. For the best results, the deactivator should be soluble in the organic substance to be protected. Since the deactivators of our invention are water soluble, they are also adapted to the stabilization of systems containing considerable proportions of water, such as aqueous solutions, emulsions and suspensions. Examples of such systems are photographic developer solutions, rubber latex and mayonnaise.

In order to avoid confusion arising from a superabundance of data, gasoline has been selected as an example of an auto-oxidizable organic substance for the purposes of illustration. The samples of gasoline used in the following tests were either cracked gasolines or blends of cracked and straight-run gasolines, completely refined, but otherwise untreated with chemical agents, such as dyes, anti-knocks and antioxidants. Since gasoline is a mixture of variable composition, identical results are not obtained with different samples. The magnitude of the effects is great enough, however, to render this difference relatively insignificant.

p-Benzylaminophenol, abbreviated BAP, has been chosen as a representative gasoline antioxidant. The metals, present as catalysts, were employed as their oleates. The concentrations of the antioxidants and the metal deactivators are given in weight percent in gasoline. The concentration of the metals are given in parts per million by weight of the metal, abbreviated P. P. M., rather than by weight of the metal oleate.

The term "stabilized gasoline" is employed to denote gasoline to which has been added an antioxidant in sufficient quantity to significantly increase its induction period in the absence of added metal catalysts.

The accelerated method, used for determining the induction periods given below, was the one described in J. I. E. C, 25, 397 (1933). It consists in heating 100 cc. of gasoline at 100° C. in a 1 liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

The experimental results, obtained in gasoline with representative metal deactivators or our invention, are given in the following tables:

TABLE I

| No. | Conc. BAP | Conc. Cu | 0.003% by weight deactivator | Induction period |
|---|---|---|---|---|
|  | Weight | P. P. M. |  | Minutes |
| 1 | 0.0 | 0.0 | None | 80 |
| 2 | 0.002 | 0.0 | None | 295 |
| 3 | 0.002 | 1.0 | None | 120 |
| 4 | 0.002 | 1.0 | Salicylal sodium glycinate | 265 |
| 5 | 0.002 | 1.0 | Salicylal disodium glutamate | 205 |
| 6 | 0.002 | 1.0 | Salicylal sodium tyrosinate | 260 |

It will be noted that these compounds counteract the catalytic effect of copper.

TABLE II

Induction period of control 140 minutes.
This gasoline, containing 0.001% BAP and having an induction period of 260 minutes in the absence of added metal catalysts, was used for the tests.

| Conc. Cu | Induction period in minutes | |
|---|---|---|
|  | No deactivator | Salicylal sodium cysteinate |
| 1.0 P. P. M. | 40 | 330 |

It will be observed that the harmful effect of copper is not only completely overcome by salicylal sodium cysteinate, but the induction period is increased beyond 260 minutes to 330 minutes. This is probably due to catalytic metals already present in the gasoline.

Although copper is the most potent and common catalyst occurring in gasoline, other metals also accelerate the oxidation of gasoline.

The catalytic effects of manganese, iron and cobalt, and their suppression by salicylal sodium glycinate are shown in Table III.

TABLE III

Induction period of control 130 minutes.
This gasoline, containing 0.002% p-(n-butylamino) phenol and having an induction period of 505 minutes in the basence of metal catalysts, was used for the tests, the results of which are presented below.

| No. | Metal catalyst | Conc. | Induction period in minutes | |
|---|---|---|---|---|
|  |  |  | No deactivator | 0.002% salicylal sodium glycinate |
|  |  | P.P.M. |  |  |
| 1 | None | | 505 | 515 |
| 2 | Manganese | 0.86 | 285 | 360 |
| 3 | Iron | 0.87 | 485 | 595 |
| 4 | Cobalt | 0.92 | 265 | 575 |

It will be noted that the catalytic effects of iron and cobalt are completely and that of manganese partially suppressed by salicylal sodium glycinate.

The metal deactivators of our invention are readily prepared by condensing one mole of the aldehyde with one mole of the salt of the carboxylic acid. The method may be illustrated by the method of preparing a representative compound, salicylal sodium glycinate as in the following example, in which all parts are by weight:

*Preparation of salicylal sodium glycinate*

One hundred thirty-four parts of salicylaldehyde in 198 parts of methanol were added to a solution consisting of 40 parts of water, 40 parts of sodium hydroxide and 76.2 parts of 98.5% glycine. The resulting mixture was refluxed for 30 minutes and cooled. The bright yellow crystals were filtered, washed with methanol and dried. The crude product was recrystallized from 250 parts of aqueous methanol (20.8% concentration by weight).

The purified product decomposed at 300° C. without having melted and contained 6.27% nitrogen by weight.

Most of these deactivators are bright yellow crystals of high melting points. They are soluble in water and are hydrolyzed by mineral acids.

It will be understood that the experiments and tests, hereinbefore given, have been given for illustrative purposes only. Many variations and modifications can be made in our invention without departing from the spirit or scope thereof. The metal deactivators of our invention can be employed in other organic substances, the metals may be present in other forms and other compounds, within the broad scope of our invention, may be substituted for the compounds specifically referred to hereinbefore. While we have disclosed the use of single metal deactivators, it will be apparent that mixtures of two or more metal deactivators of our invention may be employed if desired.

Besides many others, the condensation products of the following aldehydes with the salts of the following alpha-amino carboxylic acids are metal deactivators.

Aldehydes 2-hydroxy-5-chlorobenzaldehyde
2-hydroxy-3,5-dibromobenzaldehyde
2-hydroxy-3-nitrobenzaldehyde
2-hydroxy-6-methylbenzaldehyde
2-hydroxy-5-ter-butylbenzaldehyde
2-hydroxy-5-ter-amylbenzaldehyde
2-hydroxy-3-methoxybenzaldehyde
2,4-dihydroxybenzaldehyde
2-hydroxynaphthaldehyde-1
1-hydroxynaphthaldehyde-2
Anthrol-2-aldehyde-1
2-hydroxyfluorene-aldehyde-1
4-hydroxydiphenyl-aldehyde-3
3-hydroxyphenanthrene-aldehyde-4
1,3-dihydroxy-2,4-dialdehydobenzene

Alpha-amino carboxylic acids

| | |
|---|---|
| Arginine | Serine |
| Aspartic acid | Threonine |
| Cystine | Tryptophane |
| Isoleucine | Tyrosine |
| Leucine | Alanine |
| Lysine | Cysteine |
| Methionine | Glycine |
| Norleucine | Glutamine |
| Phenylalanine | |

It will be apparent that, by our invention, we are able to effect the stabilization of organic substances susceptible to the harmful action of molecular oxygen catalyzed by manganese, iron, cobalt, copper and their catalytically active compounds. This stabilization may be accomplished, in accordance with our invention, by the addition of metal deactivators, either alone or in combination with an amount of an antioxidant sufficient to stabilize the substance in the absence of metal catalysts. It is often technically and economically unfeasible to counteract the catalytic effects of such metals by means of an antioxidant alone. We believe that the metal deactivators of our invention function by forming very stable complexes with the metals, which complexes are catalytically inactive. It appears that the metal deactivators of our invention, in general, are not antioxidants. However, our invention is not to be limited by any theory as to the manner in which the metal deactivators functions to produce the results.

We claim:

1. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aromatic aldehyde, so that not more than 1 mole of aldehyde reacts for each primary amino group of the salt.

2. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aryl aldehyde, so that not more than 1 mole of aldehyde reacts for each primary amino group of the salt, and which metal deactivator is free of strongly acidic groups.

3. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aryl aldehyde of the benzene series, so that not more than 1 mole of aldehyde reacts for each primary amino group of the salt, and which metal deactivator is free of strongly acidic groups.

4. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of salicylaldehyde, so that not more than 1 mole of aldehyde reacts for each primary amino group of the salt, and which metal deactivator is free of strongly acidic groups.

5. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least 1 mole of an ortho-hydroxy substituted aromatic aldehyde, so that not more than 1 mole of aldehyde reacts for each primary amino group of the salt, and which metal deactivator is free of strongly acidic groups.

6. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least one mole of an ortho-hydroxy substituted aryl aldehyde of the benzene series, so that not more than 1 mole of aldehyde reacts for each primary amino group of the salt, and which metal deactivator is free of strongly acidic groups.

7. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least 1 mole of salicylaldehyde, so that not more than 1 mole of aldehyde reacts for each primary amino group of the salt, and which metal deactivator is free of strongly acidic groups.

8. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being salicylal sodium glycinate.

9. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aromatic aldehyde, so that not more than 1 mole of aldehyde reacts for each primary amino group of the salt.

10. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least 1 mole of an ortho-hydroxy substituted aromatic aldehyde, so that not more than 1 mole of aldehyde reacts for each primary amino group of the salt, and which metal deactivator is free of strongly acidic groups.

11. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and a small proportion of an antioxidant, normally effective to materially retard such deterioration in the presence of said catalyst, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least one mole of an ortho-hydroxy substituted aryl aldehyde of the benzene series, so that not more than 1 mole of aldehyde reacts for each primary amino group of the salt, and which metal deactivator is free of strongly acidic groups.

12. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least 1 mole of salicylaldehyde, so that not more than 1 mole of aldehyde reacts for each primary amino group of the salt, and which metal deactivator is free of strongly acidic groups.

13. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being salicylal sodium glycinate.

14. A composition comprising petroleum hydrocarbons, normally subject to deterioration caused by the action of molecular oxygen, containing a catalyst of the group consisting of manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aromatic aldehyde, so that not more than 1 mole of aldehyde reacts for each primary amino group of the salt.

15. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid with at least 1 mole of an ortho-hydroxy substituted aromatic aldehyde, so that not more than 1 mole of aldehyde reacts for each primary amino group of the salt.

16. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least 1 mole of an ortho-hydroxy substituted aromatic aldehyde, so that not more than 1 mole of aldehyde reacts for each primary amino group of the salt, and which metal deactivator is free of strongly acidic groups.

17. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being identical with the compound obtained by condensing 1 mole of an alkali metal salt of an alpha primary amino aliphatic carboxylic acid, containing the elements carbon, hydrogen, nitrogen, oxygen and no additional elements other than sulfur, with at least one mole of an ortho-hydroxy substituted aryl aldehyde of the benzene series, so that not more than 1 mole of aldehyde reacts for each primary amino group of the salt, and which metal deactivator is free of strongly acidic groups.

18. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being salicylal sodium glycinate.

19. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being salicylal disodium glutamate.

20. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being salicylal disodium glutamate.

21. A composition comprising an organic substance, normally subject to deterioration caused by the action of molecular oxygen, containing a catalyst of the group consisting of manganese, iron, cobalt, copper and their compounds, normally effective to catalyze oxidation of said organic substance, and having incorporated therein a metal deactivator in a small proportion sufficient to deactivate said catalyst, said metal deactivator being salicylal sodium tyrosinate.

22. A composition comprising gasoline, normally subject to deterioration caused by the action of molecular oxygen, containing a catalyst of the group consisting of manganese, iron, cobalt, copper and their compounds, normally effective to catalyze oxidation of said gasoline, and having incorporated therein a metal deactivator in a small proportion sufficient to deactivate said catalyst, said metal deactivator being salicylal sodium tyrosinate.

FREDERICK B. DOWNING.
CHARLES J. PEDERSEN.

CERTIFICATE OF CORRECTION.

Patent No. 2,363,777. November 28, 1944.

FREDERICK B. DOWNING, ET AL.

It is hereby certified that error appears in the printed specification of the above numbered patent requiring correction as follows: Page 2, second column, line 4, for "suffur" read --sulfur--; line 6, for "strongely" read --strongly--; line 59, for "and is" read --and its--; line 65, for "means" read --mean--; page 3, first column, line 67, Table I, second column thereof, for "Weight" read --Weight percent--; and second column, line 30, Table III, for "basence" read --absence--; page 4, first column, line 66, for "functions" read --function--; and that the said Letters Patent should be read with this correction therein that the same may conform to the record of the case in the Patent Office.

Signed and sealed this 20th day of March, A. D. 1945.

Leslie Frazer (Seal)

Acting Commissioner of Patents.